Sept. 22, 1964  F. H. BENDEICH ET AL  3,149,697
LUBRICANT RECEIVING FITTING
Filed Jan. 12, 1962
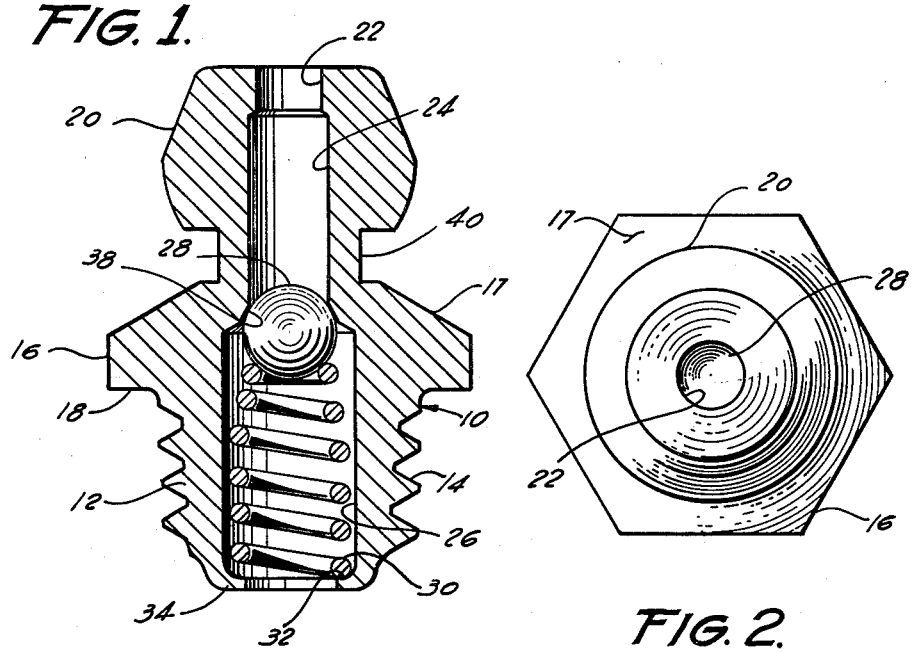
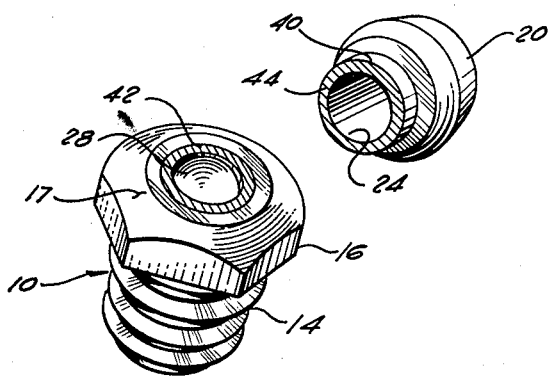
INVENTORS
Warren Berrard
Frank H. Bendeich.
By Wilhon J. Newman
  Attorney

United States Patent Office 3,149,697
Patented Sept. 22, 1964

3,149,697
LUBRICANT RECEIVING FITTING
Frank H. Bendeich, Chicago, Ill., and Warren A. Berrard, Utica, Mich., assignors to Stewart-Warner Corporation, Chicago, Ill., a corporation of Virginia
Filed Jan. 12, 1962, Ser. No. 165,894
1 Claim. (Cl. 184—1)

This invention relates to a lubricant receiving fitting and more particularly to an improved fitting whose structure may be modified to prevent subsequent lubrication operations after receiving an initial lubricant charge.

With the advent of modern lubrication systems for automobiles and other like vehicles in which the period between lubrications has been greatly extended, this type of lubrication system itself has created a problem. In order to provide lubrication systems in which further lubrication is required only after the vehicle has been operated for a period of 20,000 to 30,000 vehicle miles, the creation of special types of lubricants was found necessary. To insure that the average mechanic will not inadvertently subject such a lubrication system to conventional lubricant within this time period, it is necessary to provide means for preventing lubrication of the various components of the vehicle by defeating any attempt by the mechanic to use conventional lubrication means.

It is therefore, a primary object of this invention to provide an improved lubricant receiving fitting for use in automotive lubrication systems allowing prolonged intervals between lubrications, which prevent any attempts to add lubricant by conventional pressurized lubrication apparatus subsequent to the initial lubricating operation.

It is a further object of this invention to provide an improved lubrication receiving fitting for use in such an automotive lubrication system in which it is necessary to replace the complete lubrication receiving fitting prior to relubrication.

Further objects of this invention will be pointed out in the following detailed description and claim and illustrated in the accompanying drawing which discloses, by way of example, the principle of this invention in the best mode which has been contemplated of applying that principle.

In the drawings:

FIGURE 1 is a sectional, elevational view, of a preferred embodiment of the present invention;

FIGURE 2 is a top plan view of the device shown in FIGURE 1; and

FIGURE 3 is a perspective view of the two sections of the device shown in FIGURES 1 and 2 after severing the fitting to prevent subsequent lubrication until the fitting is replaced.

In general, the improved lubrication receiving fitting of the present invention comprises a body formed with integral head and shank portions and having a lubricant passageway extending longitudinally therethrough. Means are formed on the shank for threadedly securing the fitting to a fitting receiving member and the fitting includes a radially extending hexagonal flange for tightening the fitting within the fitting receiving member. The fitting further includes a neck portion of reduced diameter interposed between the semi-spherical head portion and the flange. A check valve is located within the lubricant passageway below the neck portion thereby allowing the head portion and the integral neck portion to be sheared at the plane of juncture between the neck and the flange to prevent further lubrication by conventional lubricating means until the remaining portions of the fitting are replaced by a new, complete fitting and in which a continued seal of lubricant by the check valve is insured.

Referring to the drawing, the improved lubricant receiving fitting, which is conventionally formed of metal, includes a body 10 having an integral shank portion 12 with external threads 14 allowing the fitting to be secured within a lubrication fitting receiving member (not shown). A conventional hexagonal flange 16 is formed immediately adjacent the inner end of the threaded portion 14 of shank 12 and includes a flat bottom surface 18 which contacts the fitting receiving member. The opposite end of the fitting is provided with an integral semi-spherical head portion 20 which has an outer diameter in the order of the shank portion 14, being considerably smaller in diameter than the hexagonal flange portion 16. The semi-spherical head portion 20 is adapted to receive the conventional female nipple of a pressurized lubrication supply apparatus such as a grease gun or the like. In order to deliver the lubricant from the grease supply apparatus to the lubricant receiving member associated with the automobile chassis, there is provided within the fitting a lubricant passageway including an inlet bore 22, a central counter bore 24 and a larger bore 26 formed centrally of the shank portion 12 which acts to receive a ball check valve 28 of a conventional structure. The large bore at the inner end 26 holds a biasing spring 30 with one end 32 of the spring seating on an inwardly turned flange 34 formed at the terminal edge of shank 12. The opposite end 36 of biasing spring 30 contacts the bottom of the ball check valve 28 and forces it against a tapered valve seat 38 located in the area of jointure between the central counter bore 24 and the larger bore 26. Conventionally, the ball check valve 28 will remain seated on valve seat 38 under force of the biasing spring 32 and prevent the entrance and egress of lubricant except during the period the lubricant is being supplied to the lubricant passageway by the pressurized lubricant supply apparatus.

The present invention is directed to method of preventing subsequent lubrication operations to the fitting by conventional lubricant supply means carrying standard lubricants after the initial filling operation. The fitting as set forth above, is advantageously used in automotive lubrication systems of the type which allows prolonged intervals between lubrications. In systems in general use today, these periods extend from 20,000 to 30,000 vehicle miles and necessarily include specially designed lubricants. If conventional lubricant is added to the system subsequent to the initial lubrication with special lubricant, the conventional lubricant may be injurious to the portions of the automobile chassis being lubricated. In addition, the possibility of adverse chemical reactions between these different compositions exists and means must be provided for preventing inadvertent subsequent lubrication by conventional lubrication apparatus. In the present invention, the improved lubricant receiving fitting includes a portion of reduced cross sectional area between the relatively wide hexagonal flange 16 and the semi-spherical head portion 20. This neck portion 40 is formed with a reduced outer diameter so as to provide a relatively weak link between the head portion 20 and the flange 16 of the main body.

The reduced cross section portions 40 allows mechanical severance along the plane of jointure between the neck 40 and the upper surface of the hexagonal flange 16. A sharp blow by a hammer or other instrument after the initial lubricant filling operation results in severance along this plane forming opposed severed areas 42 and 44. Since the ball check valve 28 seats against the valve seat 38 below this plane, regardless of the loss of this portion of the fitting, the ball check valve 28 remains seated and the lubricant within the receiving member remains sealed from the ambient. At the same time, referring to FIGURE 3, it is seen that severance of the upper section of the lubricant receiving fitting will provide a relatively large, generally flat surface 17 which will be completely unacceptable to conventional lubricant supplying apparatus thus preventing subsequent added lubrications by conventional means.

While small changes may be made to the overall configuration of the lubricant receiving fitting, it is necessary to insure that the reduced cross-sectional area or neck 40 be placed adjacent the relatively large upper surface area 17 of the hexagonal flange since it is due to the fact that after severance, this large flat surface area will not accept conventional lubricating apparatus. In addition, the further requirement must be satisfied that the ball check valve be positioned within the remaining shank portion of the fitting so as to insure continued sealing of the system after severance. Inherently, the placement of the reduced cross-sectional area or neck 40 adjacent the upper surfaces of the flange 16 effects severance at the prescribed line of jointure between neck 40 and flange 16 because flange 16 is the portion of greatest mass and neck 40 the portion of least mass.

While there has been shown, described and pointed out the fundamental novel features of the invention as applied to a preferred embodiment, it will be understood that various omissions and substitutions and changes in the form and detail of the device illustrated and in its operation may be made by those skilled in the art without departing from the spirit of the invention. It is the intention, therefore, to be limited only as indicated by the scope of the following claim.

What is claimed is:

A method of lubricating by the use of and preventing the reuse of a lubricating fitting including a threaded shank, a flange and a lubricating head, said method comprising the steps of lubricating through the head of said fitting, and severing the fitting immediately above the flange including the entire lubricating head and any other portion of the fitting which could be used for lubricating and replacing it with a standard fitting.

References Cited in the file of this patent

UNITED STATES PATENTS

| | | |
|---|---|---|
| 927,337 | Dupre | July 6, 1909 |
| 1,987,099 | Creveling | Jan. 8, 1935 |
| 2,250,123 | Boehm | July 22, 1941 |

UNITED STATES PATENT OFFICE
CERTIFICATE OF CORRECTION

Patent No. 3,149,697                            September 22, 1964

Frank H. Bendeich et al.

It is hereby certified that error appears in the above numbered patent requiring correction and that the said Letters Patent should read as corrected below.

Column 4, line 8, begining with "A method of" strike out all to and including "standard fitting." in line 15, and insert instead the following:

> A method of lubricating by the use of and preventing the reuse of a lubricating fitting including a threaded shank, a flange and a lubricating head, said method comprising the steps of lubricating through the head of said fitting, and severing the fitting immediately above the flange including the entire lubricating head and any other portion of the fitting which could be used for lubricating.

Signed and sealed this 12th day of January 1965.

(SEAL)
Attest:

ERNEST W. SWIDER                          EDWARD J. BRENNER
Attesting Officer                           Commissioner of Patents